United States Patent [19]

Harbison et al.

[11] 3,883,919
[45] May 20, 1975

[54] BLADE CONNECTION STRUCTURE TO ARM

[75] Inventors: William H. Harbison, Merrillville; Leo J. Wubbe, Beverly Shores, both of Ind.

[73] Assignee: The Anderson Company, Gary, Ind.

[22] Filed: Mar. 18, 1974

[21] Appl. No.: 451,749

[52] U.S. Cl. ............................ 15/250.32; 15/250.42
[51] Int. Cl. ............................................. B60s 1/40
[58] Field of Search ....... 15/250.35, 250.32, 250.36, 15/250.42

[56] References Cited
UNITED STATES PATENTS

| | | | |
|---|---|---|---|
| 3,378,874 | 4/1968 | Scinta | 15/250.32 |
| 3,588,942 | 6/1971 | Schlesinger | 15/250.32 |
| 3,641,614 | 2/1972 | Newsome | 15/250.32 |
| 3,751,754 | 8/1973 | Quinlan et al. | 15/250.32 |

*Primary Examiner*—Peter Feldman
*Attorney, Agent, or Firm*—Wegner, Stellman, McCord, Wiles & Wood

[57] ABSTRACT

A wiper blade assembly having a pressure-distributing structure which includes a bridge member with a connector portion adapted to be removably connected to a pin-type connector with a minimum of play or looseness therebetween. The connector portion of the bridge member is shaped in the vicinity of the pin receiving apertures so as to provide line contact with the pin of the pin-type connector to thereby provide assured retention contact between the bridge member and the pin.

6 Claims, 4 Drawing Figures

BLADE CONNECTION STRUCTURE TO ARM

BACKGROUND OF THE INVENTION

1. FIELD OF THE INVENTION

This invention relates to windshield wiper blades and more particularly to a connector on the blade for connection to a pin-type arm with a minimum of play between the two during use.

2. DESCRIPTION OF THE PRIOR ART

In the windshield wiper art there are many known and used types of connectors for connecting a wiper arm to a wiper blade. For several years one such connector in use is called a side pin connector whereby the end portion of the wiper arm has a laterally projecting pin with a reduced diameter portion in the exposed portion of the pin which reduced portion provides a pair of facing abutment shoulders. The connector on the blade has a pair of aligned openings transverse to the longitudinal axis of the pin with a spring in the bridge adapted to engage the reduced diameter portions of the pin for locking the arm to the blade. The back of the blade in the vicinity of the aligned openings is generally shaped to the curvature of the head end of the pin to conform to the diameter of the pin when inserted in the blade. In some versions the blade will have a tubular member in the bridge of the blade which, once again, will have a shape and size to conform to the size of the head end of the pin.

In the known blades, the side of the connector part of the bridge away from the retention spring is intended to be shaped to conform to the diameter of the head end of the pin, such that when the pin is in position in the blade, the shape of the side of the connector part of the bridge is frequently a mismatch for the size of the pin resulting in slop or play between the bridge and the pin which produces looseness and fishtailing of the blade relative to the arm during use.

SUMMARY OF THE INVENTION

The present invention overcomes the problems of the prior art by shaping the bridge of the blade in the vicinity of the connector so that the engagement between the bridge and the large diameter portions of the pin are line contacts lying generally parallel to the axis of the connector and the pin. The line contacts are circumferentially spaced apart on the pin on the side opposite to the area of the pin engaged by the retention spring of the connector. The location of the line contacts can vary from one pin to the next, but due to the shape of the bridge portion in the vicinity of the connection, the contact will always be a pair of lines spaced apart in such a way as to reduce or eliminate play between the blade and the arm.

BRIEF DESCRIPTION OF THE DRAWINGS

The foregoing features and advantages of the present invention will be made more apparent and further features and advantages will be set out in the following description of the preferred embodiment taken together with the accompanying drawings in which.

DESCRIPTION OF THE PREFERRED EMBODIMENT

Figure 1:
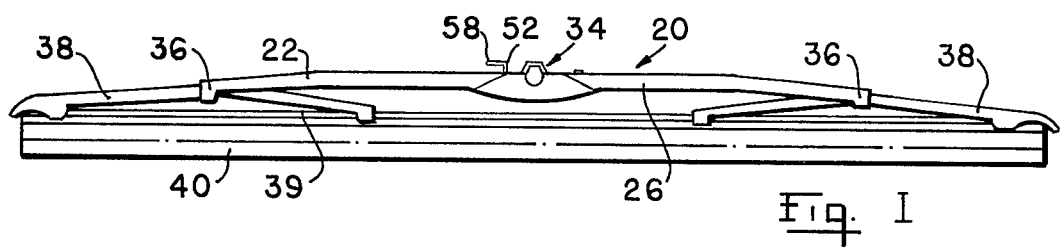
FIG. 1 is a side view of a windshield wiper blade assembly embodying the principles of the present invention.

Referring now to the drawings, a windshield wiper blade assembly 20 embodying the principles of the present invention is shown as including a superstructure having an elongated pressure-distributing primary yoke or bridge member 22 which has in cross section a channel shape including an upper wall 24 and depending spaced side walls 26 and 28 having formed therethrough aligned apertures 30 and 32, respectively. An upwardly protruding substantially straight sided portion 34 is formed in upper wall 24 of the bridge member 22 to provide abutting surfaces for the pin and the end faces of which provide the upper edges of the apertures 30, 32. Pivotally connected as at 36 at each end of bridge member 22 are secondary yokes 38. The end portions of the secondary yokes 38 are formed to slidably engage spaced portions of a backing strip 39 carried by a resilient wiping element 40. It is to be understood that the form of superstructure for the wiper blade assembly forms no part of this invention as long as the assembly includes a member to which the pin of a pin-type wiper arm is attached.

Figure 4:
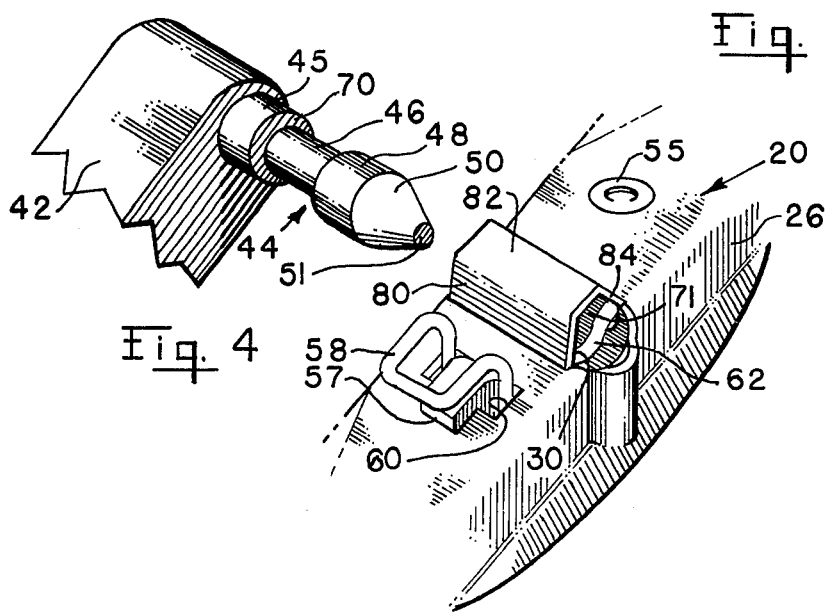

As shown in FIG. 4, the free end of a wiper arm or wiper arm extension 42 supports a laterally extending pin 44 which is adapted to be releasably attached to the wiper blade assembly 20. The pin 44 includes a reduced diameter central portion 46 between a large diameter base portion 45 adjacent the wiper arm 42 and a large diameter outer end portion 48 which may have a tapered terminus 50 with a terminal end 51. The other end of the wiper arm 42 (not shown) has means for engagement with a shaft and a driving mechanism associated with a driving motor in a manner to oscillate the wiper arm about the axis of the shaft in an appropriate arc depending upon the particular installation to move the wiper blade back and forth across the surface of a windshield.

Figure 3:
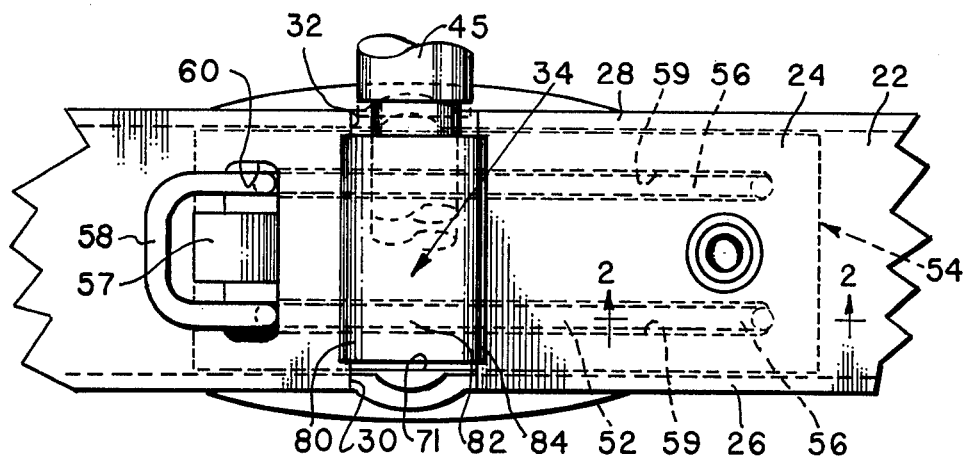
FIG. 3 is a plan view of the connector portion of the wiper blade assembly of FIG. 2; and, FIG. 4 is a schematic perspective view illustrating the configuration of the laterally extending pin at the end of the wiper arm and the manner of alignment for insertion thereof through the aperture of the wiper blade assembly.

The apertures 30, 32 in the bridge 22 are adapted for receipt of the pin 44 therethrough to releasably connect the wiper blade assembly with the end of the wiper arm. The releasable characteristic of the attachment of the wiper blade assembly 20 to pin 44 may be provided by a U-shaped wire spring member 52 which is secured to bridge member 22 by means of a mounting block 54 which has on one end portion a crosspiece 53 connected to the member 22 by rivet 55 and has on its other end portion a tongue 57 projecting through opening 60 and overlapping with the upper wall 24 of bridge 22. The U-shaped spring member 52 includes spaced, parallel leg portions 56 connected by a crosspiece or handle 58. The major part of each leg portion 56 is disposed within the channel-shaped midportion of bridge member 22 and is constrained for movement relative to the wall 24 of the bridge 22 by means of slots 59 in the block 54. The end portions of the legs 56 adjacent crosspiece or handle 58 project outwardly through the aperture 60 in upper wall 24 of bridge member 22, so that the crosspiece or handle 58 is manually accessible for manipulating the spring member. Each leg 56 has a slightly curved portion 62 in alignment with the apertures 30, 32 in the bridge 22 and is adapted to normally, resiliently engage the reduced diameter central portion 46 of pin 44 to securely hold the wiper blade assembly on the wiper arm. Each spring leg 56 includes an end portion 64 adapted to be captured between the mounting block 54 and upper wall 24 and a downturned portion 66 adapted to be anchored in the mounting block when said rivet 55 is in place. To permit insertion of the pin 44 through the apertures 30, 32 in the bridge, the mounting block includes a transverse bore 71 (see FIGS. 3 and 4) aligned with said apertures, with the walls of the bore 71 providing additional support for the large diameter portions 45, 48 of the pin 44.

Figure 2:
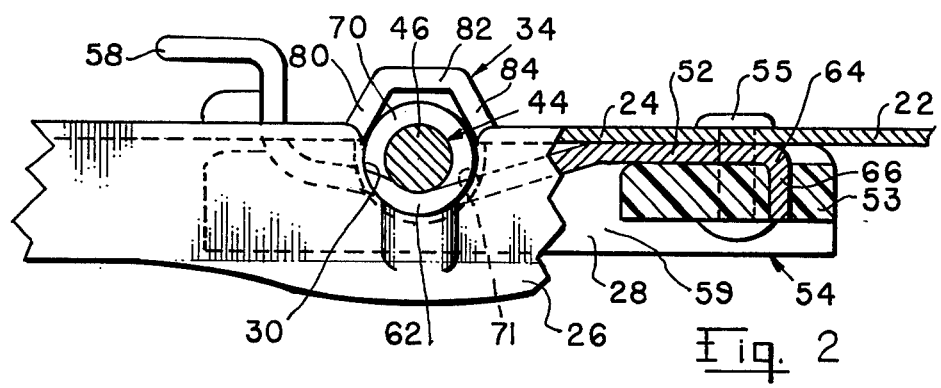
FIG. 2 is a fragmentary enlarged side view of the connector portion of the wiper blade assembly illustrated in FIG. 1.

In its unflexed condition, spring legs 56 are normally disposed with their curved portion 62 lying in the insertion path between the apertures 30, 32 as shown in FIG. 2. When the wiper blade assembly is to be attached to the pin on the arm, the spring 52 may be depressed either by hand to move portion 62 out of the path of insertion of the pin or by means of the bevelled end portion or terminus 50 of the pin being inserted through the aperture 30 or 32 in the walls 26, 28 of the bridge member in a manner such that the spring is urged aside as the pin passes toward a fully inserted position. When the spring 52 is depressed by hand, the pin 44, assuming no hang ups on shoulders 70 of the pin, can be pushed home in the connector of the bridge. When thus fully inserted, the curved portions 62 of the spring 52 engage in the reduced diameter central portion 46 of the pin to latch the blade to the arm.

The abutment shoulder or leading edge 70 between the large diameter base portion 45 and reduced diameter central portion 46 lies in a plane transverse to the elongate axis of the pin as does the shoulder between the large diameter end portion 48 and the central portion 46 such that when the spring 52 is in latched position in the pin 44 any attempted axial movement of the pin relative to the blade will not result in a camming action to force the spring 52 out of the latched position with the pin. Rather, axial removal of the pin is prevented by the curved portion 62 of spring 52 abutting against the shoulders 70. The U-shaped spring may be replaced by a flat leaf spring, which spring nests in the reduced diameter central portion 46 of the pin 44 to latch the blade to the arm without departing from the spirit of our invention.

When it is desired to remove the wiper blade assembly from the pin on the arm, pressure on the crosspiece or handle 58 of the spring 52 will move portions 62 out of the path of removal of the enlarged portions 45, 48 whereupon the pin and arm can be moved laterally out of the bridge of the blade.

The improvement is directed to the shaped portion 34 of the upper wall 24 of the blade and more particularly to the relationship between the straight angled surfaces in the vicinity of the pin entering openings 30, 32. The upper wall 24 has portion 34 made up of three relatively straight sections or portions 80, 82, 84. Sections 80 and 84 are joined at one of their edges with upper or top wall 24 and project upwardly at an angle with respect thereto. The other edge of each section 80, 84 is joined with midsection 82 to form a somewhat truncated cone in cross section. The longitudinal length of section 82 should be such that sections 80 and 84 will always contact the large diameter portions 45, 48 of the pin 44 with section 82 spaced away from contact with said portions 45, 48.

With the angled sections 80 and 84, the large diameter portions 45, 48 of the pin 44 will be urged into line contact therewith by the upward pressure of the spring 52. The line contact will be the tangent line lying parallel to the axis of the pin where the planar sections 80 and 84 are in tangential contact with the cylindrical large diameter portions 45, 48. Whenever a cylindrical part or member is urged into contact with a planar member, the resulting contact will be a line, which line is parallel to the axis of the cylinder. In the present case, a tubular or cylindrical member 45, 48 which happens to have a reduced diameter central portion 46, is urged toward a pair of planar angled sections 80, 84 whereby the cylindrical member 45, 48 will contact the spaced, planar angled sections along a pair of lines which lines will be parallel to the longitudinal axis of the cylindrical member.

Heretofore, the upper wall 24 of the bridge portion of the blade was generally cylindrically shaped at the connector part with the intent that the large diameter portions of the pin would be in peripheral contact with a substantial portion of the interior of said cylindrically shaped part when the spring urged the pin in the direction of said cyllindrically shaped portion. In practice, it was almost impossible to stamp the shaped portion of the upper wall of the blade in perfect alignment with the central axis of the aligned apertures in the opposite walls of the bridge member. Therefore, when the pin was inserted through said aligned apertures and urged by the spring in the direction of the shaped portion, frequently the large diameter portions of the pin would contact the shaped wall along a single line. The single line would be comparable to the line contact expected when a cylinder is placed inside a larger non-matching cylinder. When the blade was moved relative to the windshield, it had a tendency to fishtail or wobble with respect to the arm due to the unstable, non-holding support resulting from the single line contact between the pin and the bridge member.

With the present construction, the angled sections 80 and 84 in the wall of the bridge can be aligned in such a way that the axially spaced large diameter portions 45, 48 of the pin 44 will always contact each wall along a tangent line so that the pin will be supported against the bridge along a pair of lines which lines are parallel to each other and are parallel to the axis of the pin. In this way, the blade will not wobble relative to the pin and the arm during use. A more stable and more firm connection is established between the arm and the blade which produces an improved drive system from the motor to the windshield resulting in an improved wipe of the surface of the windshield.

We claim:

1. In a windshield wiper blade assembly having a bridge member operatively connected to a wiping element, said bridge member having a top wall and depending side walls, connector means on said bridge member for removably connecting said blade to a wiper arm, said connector means comprising a raised portion in said top wall and a pair of apertures in said side walls aligned with each other and having said raised portion extending therebetween, said raised portion having at least two planar sections angled upwardly from said top wall, and latching spring means operatively associated with said connector means, whereby a pin on said wiper arm is latched to said blade by said spring means urging said pin against said planar sections in line contact with each section.

2. In the windshield wiper blade assembly of claim 1 wherein a third planar section is joined to the two angled planar sections and has a midportion spaced farther from the axis of said aligned apertures than the midportions of said angled planar sections.

3. In the windshield wiper blade assembly of claim 1 wherein said spring means is fixed to said top wall of the bridge member on one side of said raised portion and has a release handle portion projecting through said top wall on the other side of said raised portion with an intermediate portion of the spring means overlapping a part of said aligned apertures to partially obstruct free entry into and through said apertures.

4. In the windshield wiper blade assembly of claim 2 wherein said intermediate portion of said spring means engages with a reduced diameter portion of said pin to urge large diameter portions of said pin into said line contacts with said angled planar sections.

5. In a windshield wiper blade assembly having a bridge member operatively connected to a wiping element, said bridge member having a top wall and depending side walls, connector means carried by said bridge member for removably connecting said blade to a pin on a wiper arm, said connector means comprising a raised portion in said top wall and a pair of apertures in said side walls aligned with each other and aligned with said raised portion, said raised portion comprising two planar sections angled upwardly toward each other from said top wall and having a third planar section connecting said two angled planar sections, spring means in said connector anchored at one end to said top wall on one side of said raised portion and having a free end projecting through said top wall on the opposite side of said raised portion, the midportion of said spring means spanning and overlapping the lower portion of said aligned apertures, whereby said pin having a reduced diameter portion and spaced large diameter portions is assembled with said connector by insertion through said apertures with said spring engaging said reduced diameter portion of said pin and urging said large diameter portions into line contact with each angled planar section.

6. A windshield wiper blade assembly having a bridge member operatively connected to a wiping element, said bridge member having a top wall and depending side walls, connector means on said bridge member having a raised portion in said top wall and a pair of apertures in said side walls aligned with each other and having said raised portion extending therebetween, said raised portion comprising two planar sections angled upwardly from said top wall and being joined by a third planar section which is spaced farther from the axis joining the centers of said apertures than the two angled planar sections, and spring means connected to said top wall on one side of said raised portion bridging across said aligned apertures and extending through said top wall on said other side of said raised portion.

* * * * *